US008327363B2

(12) United States Patent
Gopalan et al.

(10) Patent No.: US 8,327,363 B2
(45) Date of Patent: Dec. 4, 2012

(54) APPLICATION COMPATIBILITY IN MULTI-CORE SYSTEMS

(75) Inventors: Yadhu Gopalan, Issaquah, WA (US); Bor-ming Hsieh, Redmond, WA (US); Mark Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 11/782,060

(22) Filed: Jul. 24, 2007

(65) Prior Publication Data

US 2009/0031318 A1 Jan. 29, 2009

(51) Int. Cl.
G06F 9/46 (2006.01)

(52) U.S. Cl. ........ 718/102; 718/100; 718/103; 718/104; 718/105; 718/106

(58) Field of Classification Search .................. 718/100, 718/103, 104, 106
See application file for complete search history.

(56) References Cited

U.S. PATENT DOCUMENTS

| 5,745,778 | A | | 4/1998 | Alfieri | |
|---|---|---|---|---|---|
| 5,826,081 | A | | 10/1998 | Zolnowsky | |
| 5,872,972 | A | * | 2/1999 | Boland et al. ................. | 718/102 |
| 6,105,053 | A | | 8/2000 | Kimmel et al. | |
| 6,243,788 | B1 | | 6/2001 | Franke et al. | |
| 6,289,369 | B1 | * | 9/2001 | Sundaresan ................... | 718/103 |
| 6,327,630 | B1 | | 12/2001 | Carroll et al. | |
| 6,584,488 | B1 | * | 6/2003 | Brenner et al. ............... | 718/103 |
| 6,633,897 | B1 | * | 10/2003 | Browning et al. ............ | 718/103 |
| 6,681,320 | B1 | | 1/2004 | Marr ............................. | 712/216 |
| 6,728,959 | B1 | | 4/2004 | Merkey | |
| 6,766,515 | B1 | | 7/2004 | Bitar et al. | |
| 6,993,767 | B2 | * | 1/2006 | Brenner et al. ............... | 718/105 |
| 7,007,046 | B2 | | 2/2006 | Manley et al. ................. | 707/204 |
| 7,069,562 | B2 | | 6/2006 | Kushnirskiy et al. ......... | 719/328 |
| 7,178,145 | B2 | * | 2/2007 | Bono ............................. | 718/100 |
| 2003/0191794 | A1 | * | 10/2003 | Brenner et al. ............... | 709/103 |
| 2004/0199919 | A1 | | 10/2004 | Tovinkere | |
| 2005/0097578 | A1 | * | 5/2005 | Rangarajan .................... | 719/330 |
| 2005/0132217 | A1 | | 6/2005 | Srinivasan et al. ............. | 726/22 |
| 2005/0246461 | A1 | * | 11/2005 | Accapadi et al. ............. | 710/200 |
| 2006/0075398 | A1 | | 4/2006 | Bennett et al. ................ | 717/170 |
| 2006/0150184 | A1 | | 7/2006 | Hankins et al. | |
| 2006/0200825 | A1 | | 9/2006 | Potter, Jr. | |

(Continued)

FOREIGN PATENT DOCUMENTS

EP      1 770 509 A2    4/2007

(Continued)

OTHER PUBLICATIONS

Michael M. Swift et al., Improving the Reliability of Commodity Operating Systems, Oct. 19-22, 2003, http://nooks.cs.washington.edu/nooks-sosp.pdf.

(Continued)

*Primary Examiner* — Emerson Puente
*Assistant Examiner* — Charles Swift
(74) *Attorney, Agent, or Firm* — Merchant & Gould

(57) ABSTRACT

Scheduling of threads in a multi-core system running various legacy applications along with multi-core compatible applications is configured such that threads from older single thread applications are assigned fixed affinity. Threads from multi-thread/single core applications are scheduled such that one thread at a time is made available to the cores based on the thread priority preventing conflicts and increasing resource efficiency. Threads from multi-core compatible applications are handled regularly.

20 Claims, 7 Drawing Sheets

U.S. PATENT DOCUMENTS

| | | | |
|---|---|---|---|
| 2007/0083735 A1 | 4/2007 | Glew | |
| 2007/0083874 A1 | 4/2007 | Vasudevan et al. | 719/328 |
| 2007/0220517 A1* | 9/2007 | Lippett | 718/102 |
| 2007/0294694 A1* | 12/2007 | Jeter et al. | 718/102 |
| 2008/0127071 A1* | 5/2008 | Lu et al. | 717/116 |
| 2009/0031317 A1 | 1/2009 | Gopalan et al. | |

FOREIGN PATENT DOCUMENTS

| | | |
|---|---|---|
| WO | WO 2005/066799 A1 | 7/2005 |
| WO | WO 2005/096143 A1 | 10/2005 |

OTHER PUBLICATIONS

David Brash, The ARM Architecture Version 6 (ARMv6), Jan. 2002, http://www.simplemachines.it/doc/ARMv6_Architecture.pdf.

White Paper, VME Momentum, http://www.vita.com/whitepapers/VME%20Momentum.pdf 2 pgs. (including VITA News Release dated Nov. 11, 2004 referencing the White Paper, 3 pgs.).

Chakraborty, K. et al., "Computation Spreading: Employing Hardware Migration to Specialize CMP Cores On-the-fly," *ASPLOS'06*, San Jose, California, 10 pages (2006).

International Search Report and Written Opinion cited in International Application No. PCT/US2008/068918 mailed Feb. 2, 2009.

Mackerras, P. et al., "Operating system exploitation of the POWER5 system," *IBM J. Res. & Dev.*, vol. 49, No. 4/5, pp. 533-539 (Jul./Sep. 2005).

Paxson, V. et al., "An Architecture for Exploiting Multi-Core Processors to Parallelize Network Intrusion Prevention," *IEEE Sarnoff Symposium*, 7 pages. (2007).

U.S. Final Office Action U.S. Appl. No. 11/782,000 mailed Sep. 28, 2011.

U.S. Non-Final Office Action U.S. Appl. No. 11/782,000 mailed Apr. 12, 2011.

Vouk, N., "Buddy Threading in Distributed Applications on Simultaneous Multi-Threading Processors," Master's Thesis, North Carolina State University, pp. i-viii, 1-87 (2005).

\* cited by examiner

APPLICATION COMPATIBILITY IN MULTI-CORE SYSTEMS

BACKGROUND

A multi-core microprocessor (or chip-level multiprocessor, CMP) is one that combines two or more independent processors into a single package, often a single integrated circuit (IC). For example, a dual-core device contains two independent microprocessors and a quad-core device contains four microprocessors. A multi-core microprocessor implements multiprocessing in a single physical package. Cores in a multi-core device may share a single coherent cache at the highest on-device cache level or may have separate caches. The processors typically also share the same interconnect to the rest of the system. Each "core" independently implements optimizations such as superscalar execution, pipelining, and multithreading. A system with N cores is effective when it is presented with N or more threads concurrently.

While newer applications are written taking multi-core operations into account and even taking advantage of those, legacy applications designed for single core processor may not operate properly in a multi-core environment. This challenge becomes even more complicated when thread affinity is taken into consideration as well. Thread affinity is where a thread is fixed to run on a particular core.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to coordinating thread scheduling of applications designed for single thread operation, multi-thread but single core operation, and multi-core operation. A scheduler according to embodiments may be configured to set a fixed affinity for single thread applications, allow scheduling of one thread at a time for multi-thread applications, and regular multi-core operation for newer multi-core compatible applications.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, threads from different types of applications may be scheduled in a multi-core system such that different legacy applications can be executed without a thread processing conflict. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
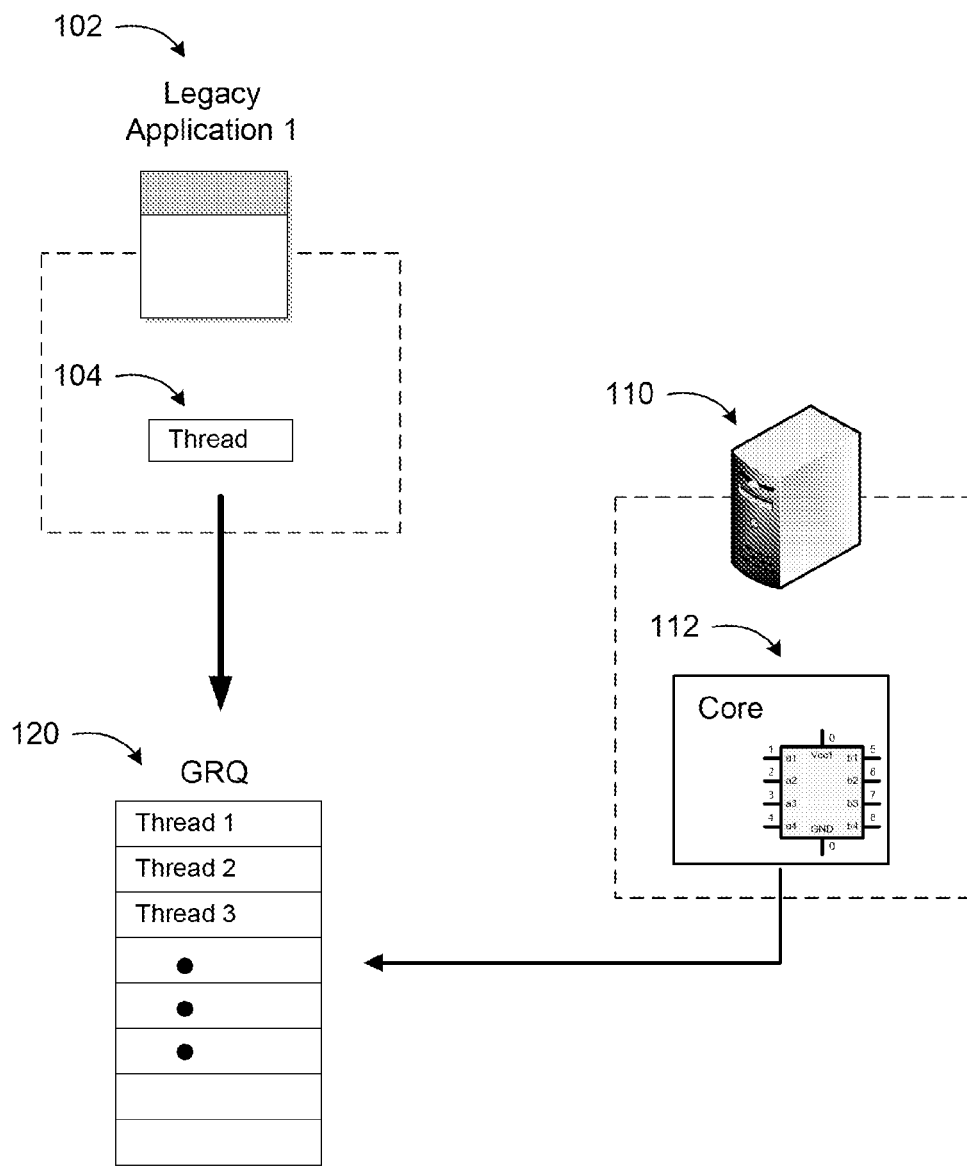
FIG. 1 illustrates an example single thread legacy application submitting its threads to the Global Run Queue (GRQ) of a single core system.

Referring to FIG. 1, an example single thread legacy application submitting its threads to the Global Run Queue (GRQ) of a single core system is illustrated. In a single core system, scheduling of threads is a relatively straight forward process since all threads are typically held in a single queue and ordered by a predefined prioritization method to be processed by the processor one-by-one.

As shown in the figure, legacy application 1 (102) issues one thread (104) at a time, which may be placed in a GRQ 120 along with threads from other applications and/or operating system. The single core (112) processor of system 110 picks the top thread based on priority, processes, and returns the results, repeating the process as the threads in the GRQ 120 get incremented up.

Figure 2:
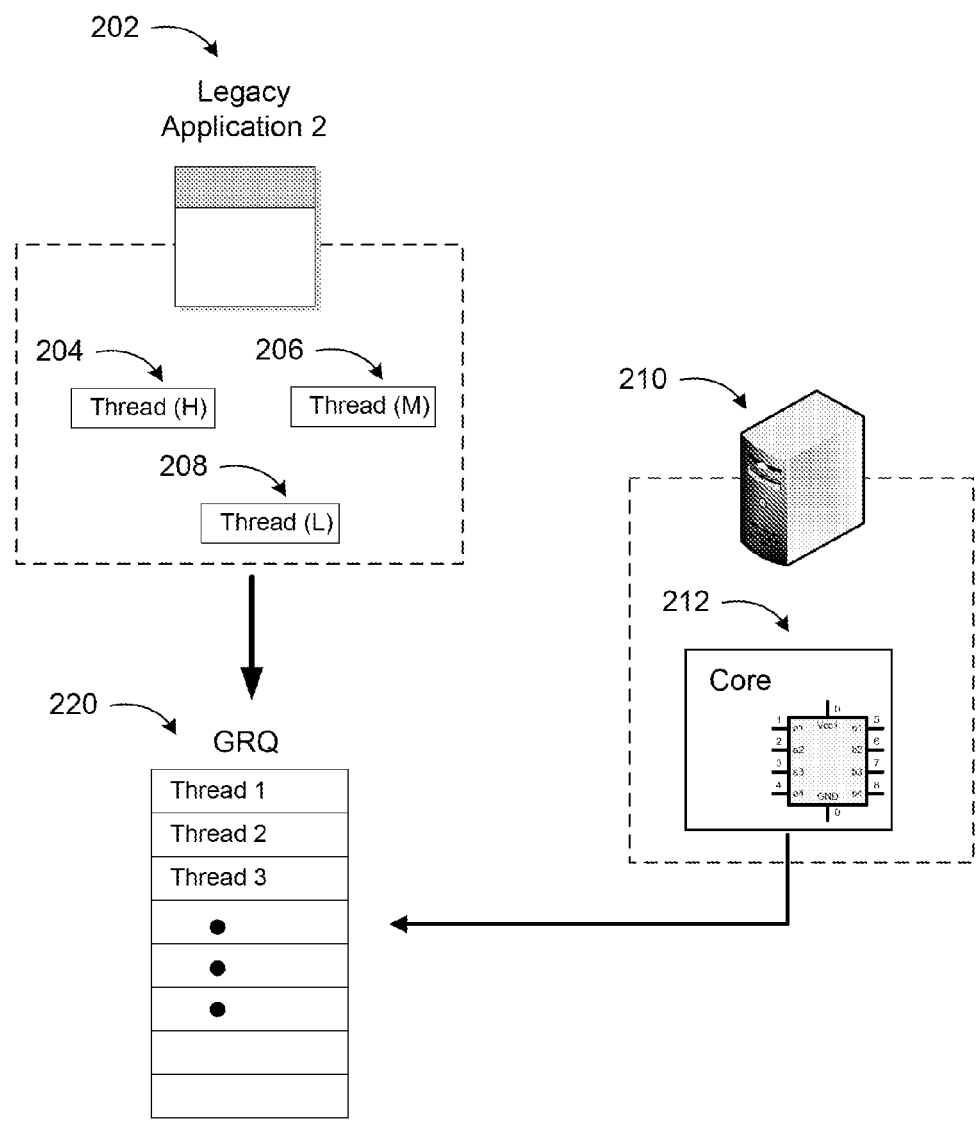
FIG. 2 illustrates an example multi-thread/single core legacy application submitting its threads to the GRQ of a single core system.

FIG. 2 illustrates an example multi-thread/single core legacy application submitting its threads to the GRQ of a single core system. As discussed before, a majority of legacy application software is written for single thread operations, although there are also a group of applications written to use multiple concurrent threads. A common pattern in multi-thread application design is where a single thread does the intensive work while other threads do much less. For example a virus scan application may create a new thread for the scan process, while the Graphic User Interface (GUI) thread waits for commands from the user (e.g. cancel the scan). In such cases, multi-core architecture is of little benefit for the application itself due to the single thread doing all heavy processing and the inability to balance the work evenly across multiple cores.

There are several types of multi-thread applications. A simple type of multi-threading is where one thread runs until it is blocked by an event that normally would create a long latency stall. Such a stall might be a cache-miss that has to access off-chip memory, which might take hundreds of CPU cycles for the data to return. Instead of waiting for the stall to resolve, a threaded processor may switch execution to another thread that is ready to run. Only when the data for the previous thread arrives, is the previous thread placed back on the list of ready-to-run threads.

Interleaved multi-threading is a higher performance type of multi-threading where the processor switches threads every CPU cycle. One of the most advanced type of multi-threading applies to superscalar processors. A normal superscalar processor issues multiple instructions from a single thread every CPU cycle. In simultaneous multi-threading (SMT), the superscalar processor issues one instruction from multiple threads every CPU cycle. Recognizing that any single thread has a limited amount of instruction level parallelism, this type of multithreading is trying to exploit parallelism available across multiple threads.

In a typical operation, legacy application 2 (202) may issue multiple threads 204, 206, and 208 at the same time. The threads may have differing priority levels (e.g. high, medium, low). As discussed above, the threads may be placed in GRQ 220 and processed by the single core 212 by switching threads every CPU cycle, issuing one instruction from multiple threads every CPU cycle, and the like.

Figure 3:
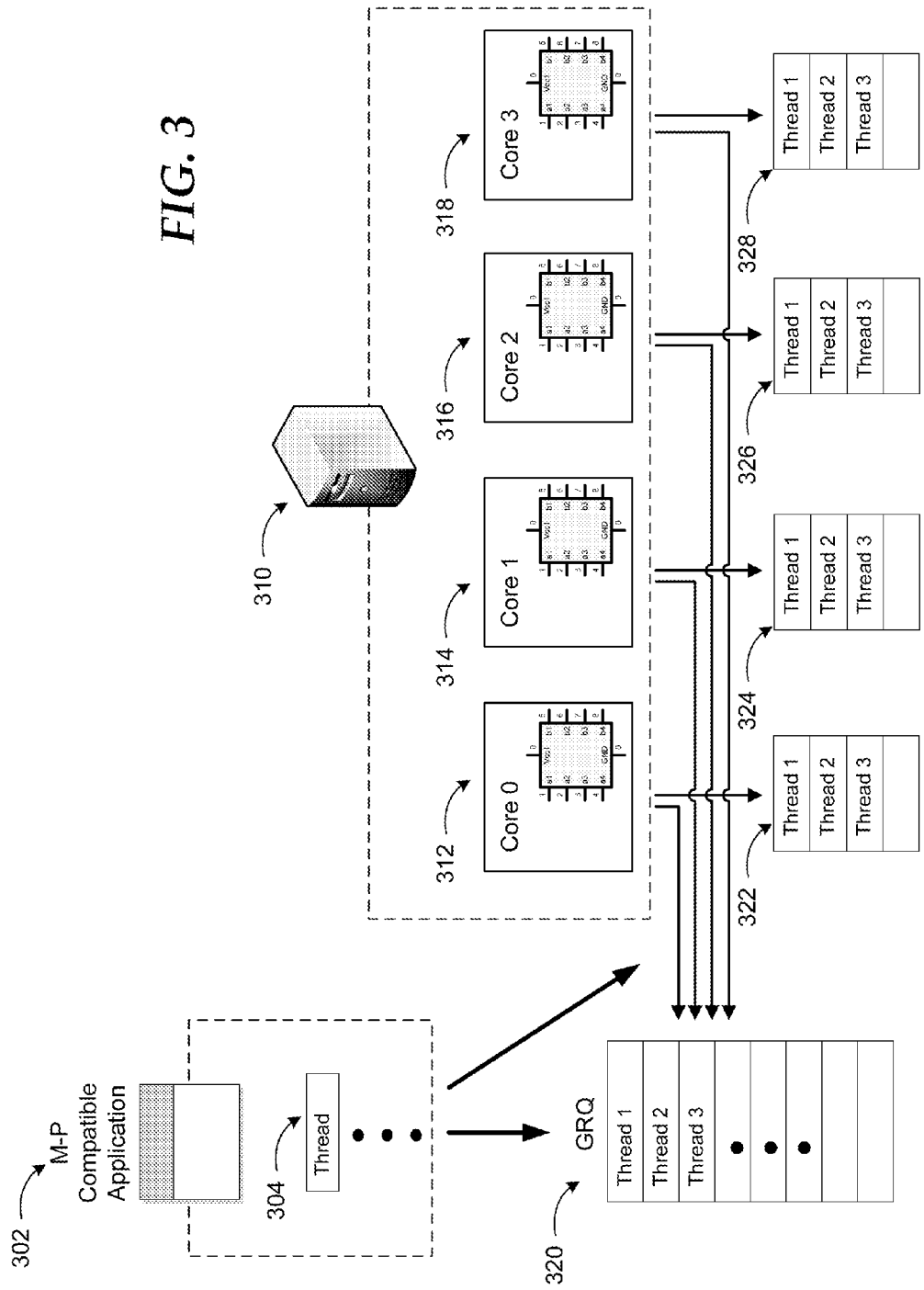
FIG. 3 illustrates an example multi-core compatible application submitting its threads to the GRQ and per-processor queues (PPQs) of a multi-core system.

Both types of legacy applications, discussed in FIG. 2 and FIG. 3, are not designed for multi-core environments and conflicts and errors may occur as threads are to be distributed among the plurality of cores of a multi-core system.

FIG. 3 illustrates an example multi-core compatible application submitting its threads to the GRQ and per-processor queues (PPQs) of a multi-core system.

Multi-core systems, which are becoming increasingly popular, provide many advantages in terms of processor power, efficiency, and the like. Furthermore, the close proximity of multiple CPU cores on the same die has the advantage of allowing the cache coherency circuitry to operate at a much higher clock rate than is possible if the signals have to travel off-chip. Combining equivalent CPUs on a single die significantly improves the performance of cache snoop operations. This means that signals between different CPUs travel shorter distances, and therefore those signals degrade less. These higher quality signals allow more data to be sent in a given time period since individual signals can be shorter and do not need to be repeated as often.

Assuming that the die can fit into the package, physically, the multi-core CPU designs require much less Printed Circuit Board (PCB) space than multi-chip designs. Also, a dual-core processor uses typically less power than two coupled single-core processors, principally because of the increased power required to drive signals external to the chip and because the smaller silicon process geometry allows the cores to operate at lower voltages. Moreover, the cores share some circuitry, like the L2 cache and the interface to the front side bus (FSB).

Software also benefits from multi-core architectures where code can be executed in parallel. Under most common operating systems, this requires code to execute in separate threads or processes. Each application running on a system runs in its own process so multiple applications will benefit from multi-core architectures. Each application may also have multiple threads but, in most cases, it may have to be specifically written to utilize multiple threads. Operating system software also tends to run many threads as a part of its normal operation. For example, running virtual machines benefits from adoption of multiple core architectures since each virtual machine runs independently of others and can be executed in parallel.

As shown in the figure, the processor block of system 310 may include any number of cores, for example four. Core 0 (312), core 1 (314), core 2 (316), and core 4 (318) may process separate threads in parallel increasing the performance of the system. GRQ 320 holds threads from applications or the operating system waiting availability of a core. A scheduler (not shown) may schedule the threads in the GRQ 320 based on a priority assigned by the owner application such as multi-core compatible application 302. A multi-core system according to embodiments may also include per-processor queues (PPQs) associated with each core such that threads with fixed affinity can be placed in those by the scheduler. Example PPQs are shown in the figure as queues 322, 324, 326, and 328.

As mentioned previously, legacy applications may cause blockage of the GRQ or inefficient use of the multiple cores. Furthermore, if all threads, including the fixed affinity ones and the no-affinity ones, are held by the GRQ, a further inefficient use of system resources may result. For example, a number of threads with fixed affinity may hold up the upward incrementing of the threads in the GRQ when other cores are available for processing. Thus, different types of legacy applications may be handled accordingly in a multi-core system for compatibility and optimized efficiency purposes.

Figure 4:
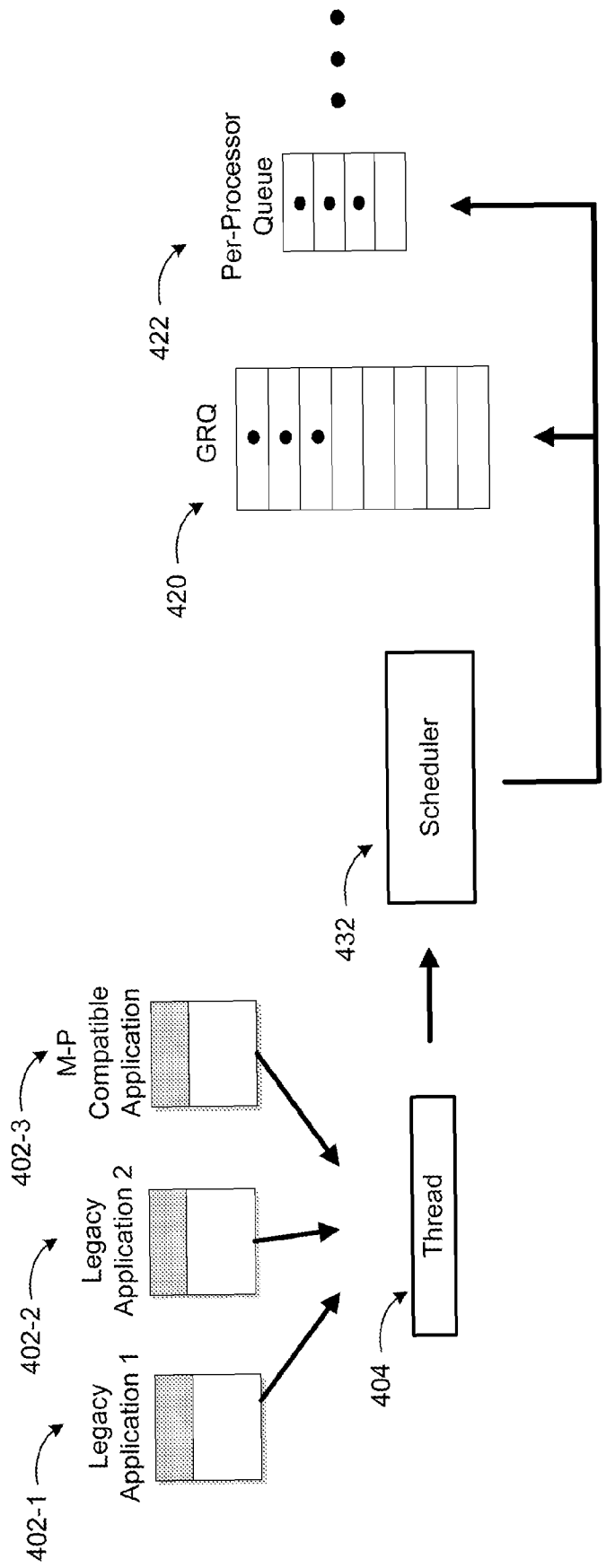
FIG. 4 is a conceptual diagram illustrating scheduling of threads from various application types in an affinity enabled multi-core system according to embodiments.

FIG. 4 is a conceptual diagram illustrating scheduling of threads from various application types in an affinity enabled multi-core system according to embodiments. A multi-core system may expect to receive processing requests from any one of the three types of applications described above.

Single thread legacy application 402-1, multi-thread application 402-2, and multi-core compatible application 402-3 may all provide their threads (e.g. thread 404) to scheduler 432 for placement in one of the queues of the system. According to one embodiment, scheduler 432 may assign a fixed affinity to the threads of single thread legacy application 402-1 and place them in the order of their arrival to the respective PPQ (e.g. PPQ 422) of the assigned core.

According another embodiment, scheduler 432 may place hold a place in GRQ 420 (or one of the PPQs) for the threads of multi-thread application 402-2. The threads are then placed into the held spot in GRQ 420 one at a time based on their priority. For example, if application 402-2 has a high, a medium, and a low thread to be processed, the high priority thread may be placed in the GRQ first. Once that thread is processed (or blocked), the medium priority thread is placed, and when that is processed, the low priority thread is placed.

While the medium and low priority threads are placed in the GRQ, the place holder may change its position tip or down depending on a priority of other pending threads. For example, another high priority thread may arrive while the high priority thread of the multi-thread application is being processed. Thus, the medium priority thread of the multi-thread application may be shifted below the newly arriving high priority thread. Of course, an upward shift may also happen if the priorities are reversed.

As mentioned, the threads from the multi-thread application may also be placed in one of the PPQs, if they have fixed affinity to a particular core. When the thread is received for processing, the scheduler may first check if the thread has fixed affinity for particular core. If the thread is assigned to a particular core, it is placed in the respective per-processor queue depending on the priority of the thread and the already waiting threads in that queue.

Threads from multi-core compatible application 402-3 are handled by scheduler 432 regularly since the application is designed to take advantage of the multi-core capability of the processing system. The application may assign some of its threads to particular cores, while others may have no affinity.

When a processor core becomes available in the multi-core system, it checks both the GRQ 420 and its own per-processor queue (e.g. 422). In situations, where the queues (the GRQ and the per-processor queues) have threads with varying priorities, the cores can easily select the highest priority thread and process it. When the threads in both the GRQ and the per-processor queue have the same priority, the selection may be based on a weighted sequencing of threads based on their time of arrival.

While the example systems are described above with specific core numbers and queue configuration, embodiments are not so limited. Application compatibility in a multi-core system using per-processor queues may be implemented using any number of cores and/or queues. For example, a group of cores may share a per-processor queue.

Figure 5:
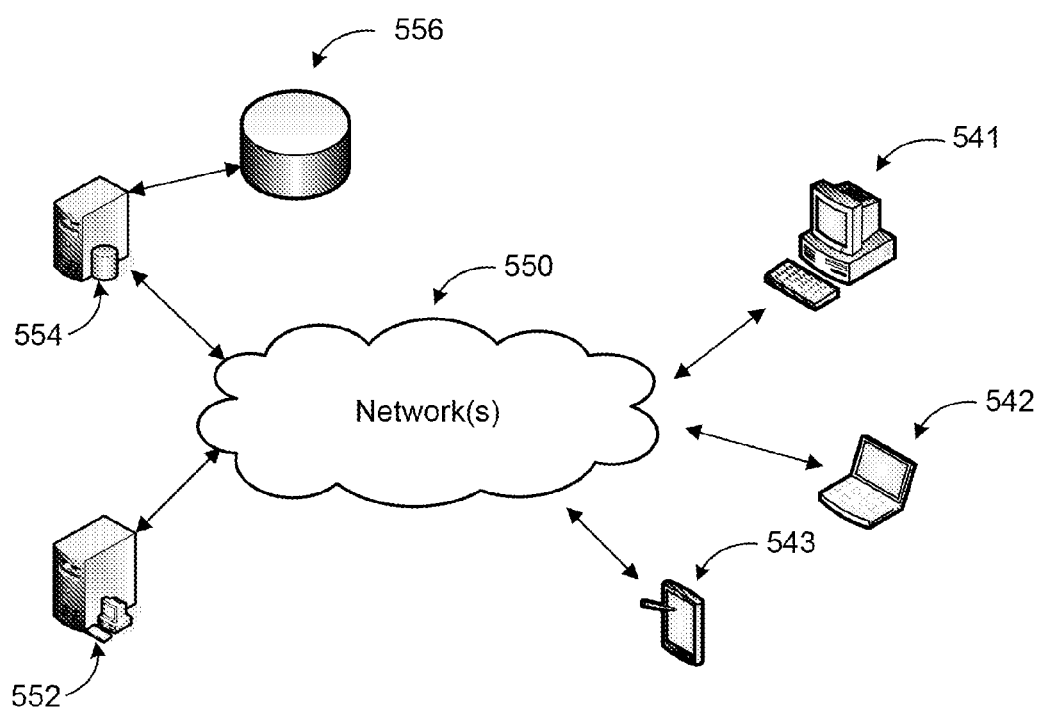
FIG. 5 is an example networked environment, where embodiments may be implemented.

FIG. 5 is an example networked environment, where embodiments may be implemented. Application compatibility in a multi-core system using per-processor queues may be implemented locally on a single computing device or in server providing services in a distributed manner to clients over a number of physical and virtual systems. They may also be implemented in un-clustered systems or clustered systems employing a number of nodes communicating over one or more networks (e.g. network(s) 550).

Such a system may comprise any topology of servers, clients, Internet service providers, and communication media. Also, the system may have a static or dynamic topology. The term "client" may refer to a client application or a client device. While a networked system implementing application compatibility in a multi-core system using per-processor queues may involve many more components, relevant ones are discussed in conjunction with this figure.

Any one of the computing devices in the figure, such as client devices 541-543 or servers 552 and 554 may be multi-core devices implementing application compatibility over GRQ and per-processor queues. Each computing device may have its own operating system or share one, and each device may execute applications that run locally or interact with other devices/applications. Thus, the cores of the processors of each device may receive threads from the operating systems and/or applications running locally or on other devices.

Schedulers for the processors of each device or the system may place the threads on the GRQ(s) and per-processor queues based on their affinity status as described above. Results of processed threads are then provided by the respective cores to the submitting operating system or application.

The networked system may also include data stores (e.g. 556) and associated database servers (e.g. 554) to store data associated with the applications providing the threads to the multi-core processors as well as associated with the operating system(s).

Network(s) 550 may include a secure network such as an enterprise network, an unsecure network such as a wireless open network, or the Internet. Network(s) 550 provide communication between the nodes described herein. By way of example, and not limitation, network(s) 550 may include wired media such as a wired network or direct-wired connection, and wireless media such as acoustic, RF, infrared and other wireless media.

Many other configurations of computing devices, applications, data sources, data distribution systems may be employed to implement application compatibility in a multi-core system using per-processor queues. Furthermore, the networked environments discussed in FIG. 5 are for illustration purposes only. Embodiments are not limited to the example applications, modules, or processes.

Figure 6:
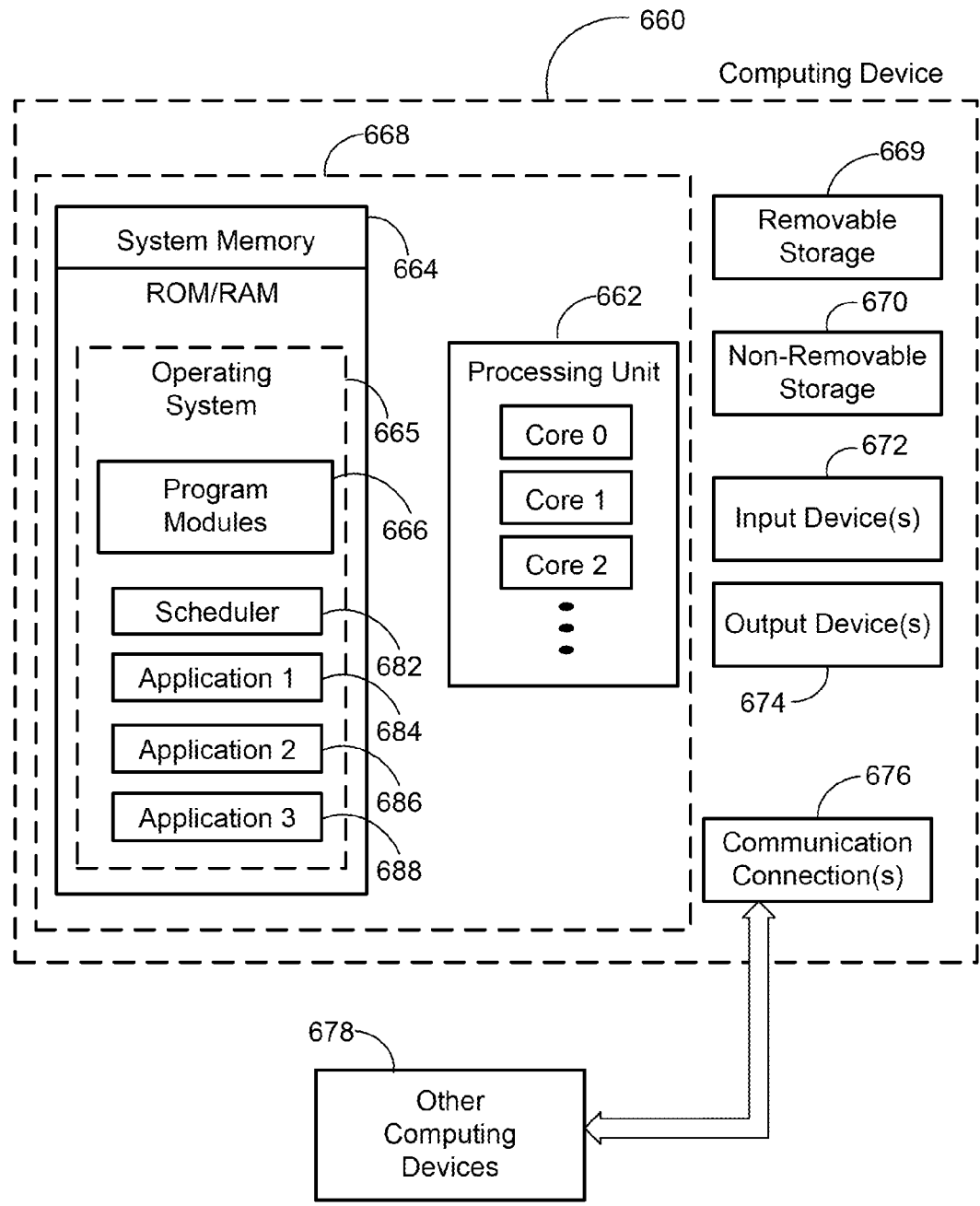
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 660. In a basic configuration, the computing device 660 may be a server or client device and typically include at least one processing unit 662 with multiple cores and system memory 664. Computing device 660 may also include a plurality of processing units that cooperate in executing programs. Depending on the exact configuration and type of computing device, the system memory 664 may be volatile (such as RAM), non-volatile (such as ROM, flash memory, etc.) or some combination of the two. System memory 664 typically includes an operating system 665 suitable for controlling the operation of a networked computing device, such as the WINDOWS® operating systems from MICROSOFT CORPORATION of Redmond, Wash. The system memory 664 may also include one or more software applications such as program modules 666, scheduler 682, and applications 1 through 3 (684-688).

Scheduler 682 may place threads from legacy applications 684 and 686 (as well as multi-core compatible application 688) or operating system 665 in a GRQ and per-processor queues associated with the processing unit 662 as discussed earlier. This basic configuration is illustrated in FIG. 6 by those components within dashed line 668.

The computing device 660 may have additional features or functionality. For example, the computing device 660 may also include additional data storage devices (removable and/or non-removable) such as, for example, magnetic disks, optical disks, or tape. Such additional storage is illustrated in FIG. 6 by removable storage 669 and non-removable storage 670. Computer storage media may include volatile and non-volatile, removable and non-removable media implemented in any method or technology for storage of information, such as computer readable instructions, data structures, program modules, or other data. System memory 664, removable storage 669 and non-removable storage 670 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 660. Any such computer storage media may be part of device 660. Computing device 660 may also have input device(s) 672 such as keyboard, mouse, pen, voice input device, touch input device, etc. Output device(s) 674 such as a display, speakers, printer, etc. may also be included. These devices are well known in the art and need not be discussed at length here.

The computing device 660 may also contain communication connections 676 that allow the device to communicate with other computing devices 678, such as over a wireless network in a distributed computing environment, for example, an intranet or the Internet. Other computing devices 678 may include devices that execute distributed applications, which may submit threads to scheduler 682 of computing device 660. Communication connection 676 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
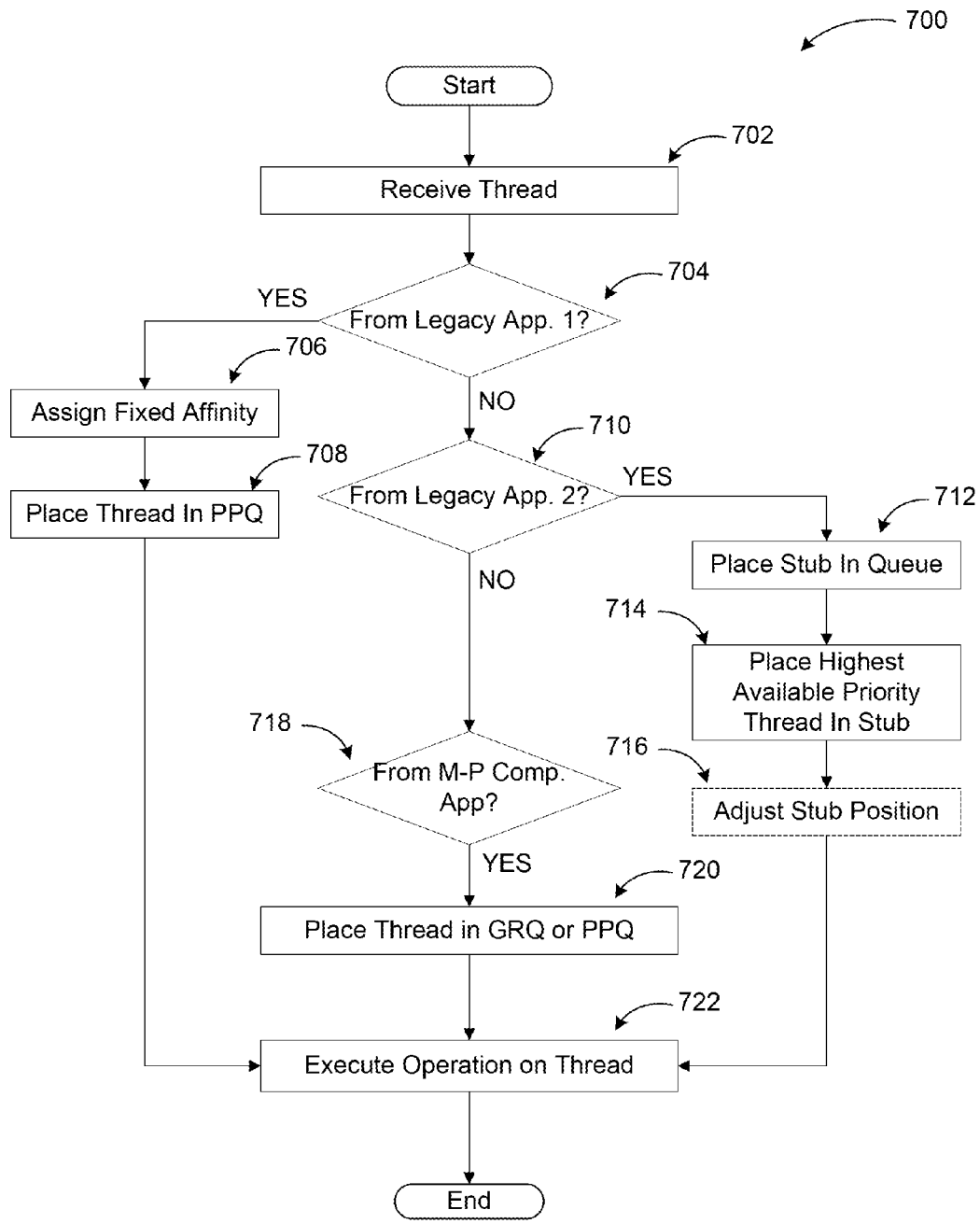
FIG. 7 illustrates a logic flow diagram of a process of scheduling and processing of threads from multi-core compatible and legacy applications in a multi-core system according to embodiments.

FIG. 7 illustrates a logic flow diagram of process 700 for scheduling and processing of threads from multi-core compatible and legacy applications in a multi-core system according to embodiments. Process 700 may be implemented in a multi-core processing unit of a computing device.

Process 700 begins with operation 702, where a thread is received from an application or the operating system. An affinity of the thread (if one exists) may also be determined at this operation. Processing advances from operation 702 to decision operation 704.

At decision operation 704, a determination is made whether the thread is from a single thread legacy application. If the thread is from a single thread legacy application, a fixed affinity is assigned to the thread at next operation 706, the thread placed in the respective PPQ at following operation 708, and the thread processed at subsequent operation 722. If the determination at decision operation 704 is negative, processing advances from decision operation 704 to decision operation 720.

At decision operation 710, a determination is made whether the thread is from a multi-thread legacy application. If the thread is from a multi-thread legacy application, a stub is placed in the processing queue at next operation 712, the thread with highest priority from the legacy application placed in place of the stub at following operation 714, and the stub position adjusted at subsequent optional operation 716 based on a priority of the legacy application thread and any pending threads in the queue. Then the thread may be processed at operation 722. If the determination at decision operation 710 is negative, processing advances from decision operation 710 to decision operation 718.

At decision operation 718, a determination is made whether the application is a multi-core compatible application. If the application is a compatible application, the thread is placed in the GRQ or one of the PPQs depending on a designation by the application at a next operation 720.

At operation 722 following operation 720, the thread is processed by the multi-core processor providing the results to the requesting application and/or operating system. After operation 722, processing moves to a calling process for further actions.

The operations included in process 700 are for illustration purposes. Scheduling threads in an application compatible multi-core system over a GRQ and per-processor queues according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for managing application compatibility in a multi-core processor system, the method comprising:
   receiving a thread from an application for processing by the multi-core processor system;
   determining whether the thread has a fixed core affinity for being executed by a particular core of the multi-core processor system;
   determining whether the received thread is from a single-thread legacy application, a multi-thread legacy application or a multi-core compatible application;
   when the thread is determined to be from a single-thread legacy application, assigning the fixed core affinity to the thread when the received thread is determined not to have an included fixed core affinity and placing the thread in the order of its arrival to a per-processor queue associated with the included fixed core affinity or the assigned fixed core affinity;
   when the thread is determined to be from the multi-thread legacy application, placing the received thread in a global run queue according to a determined priority when the thread is determined to not have the fixed core affinity to a particular core or placing the received thread in the per-processor queue when the thread is determined to have the fixed core affinity to a particular core; and
   when the thread is determined to be from the multi-core compatible application, placing the thread in one of the global run queue and the per-processor queue based on a designation by the application and the determination of whether the thread has the fixed core affinity for being executed by a particular core of the multi-core processor system.

2. The method of claim 1, further comprising:
   when the thread is determined to be from the multi-thread legacy application, placing a stub in one of the global run queue and the per-processor queue and scheduling threads from the multi-thread legacy application one at a time through the stub.

3. The method of claim 2, further comprising:
modifying a position of the stub based on a priority of the thread from the multi-thread legacy application and a priority of another thread in the one of the global run queue and the per-processor queue.

4. The method of claim 3, wherein the thread from the multi-thread legacy application has one of: a high, a medium, and a low priority.

5. The method of claim 2, further comprising:
placing the stub in the per-processor queue if the multi-thread legacy application has an affinity for a particular core of the multi-core processor system.

6. The method of claim 1, wherein each core of the multi-core processor system is configured to check the global run queue and the per-processor queue associated with itself for a highest priority thread upon becoming available for processing.

7. The method of claim 6, wherein the single-thread legacy application, the multi-thread legacy application, and the multi-core compatible application are executed by one of: the multi-core processor system locally and another processing system remotely.

8. The method of claim 1, further comprising:
providing a result of processing the thread to one of the single-thread legacy application, the multi-thread legacy application or the multi-core compatible application from which the thread was received.

9. The method of claim 1, wherein the thread is placed in one of the global run queue and the per-processor queue based on a priority assigned to the thread by one of the single-thread legacy application, the multi-thread legacy application or the multi-core compatible application from which the thread was received and a priority status of pending threads in the global run queue or the per-processor queue, and wherein the priority assigned to the thread is based on a sequence number associated with a time of arrival of the thread if two threads in the global run queue and the per-processor queue have equal priority levels.

10. A system for managing application compatibility in a multi-core processor environment, the system comprising:
a memory;
a processor coupled to the memory, comprising a plurality of distinct processing cores, the processor configured to:
receive a thread from an application for processing using at least one of the plurality of distinct processing cores;
determining whether the thread has a fixed core affinity for being executed by a particular core of the plurality of distinct processing cores;
determining whether the received thread is from a single-thread legacy application, a multi-thread legacy application or a multi-core compatible application;
when the thread is determined to be from the multi-core compatible application:
placing the thread in one of a global run queue and a per-processor queue based on a designation by the application and the determination of whether the thread has the fixed core affinity for being executed by a particular core of the processor;
when the thread is determined to be from a single-thread legacy application, assigning the fixed core affinity to the thread when the received thread is determined not to have an included fixed core affinity and placing the thread in the order of its arrival to the per-processor queue associated with the included fixed core affinity or the assigned fixed core affinity; and
when the thread is determined to be from the multi-thread legacy application:
placing a stub in the global run queue, placing the received thread in the global run queue according to a determined priority when the thread is determined to not have the fixed core affinity to a particular core and scheduling a highest priority thread from the multi-thread legacy application to be processed through the stub; or
placing the received thread in the per-processor queue when the thread is determined to have the fixed core affinity to a particular core.

11. The system of claim 10, wherein the processor is further configured to schedule a next highest priority thread from the single-thread legacy application or the multi-thread legacy application to be processed upon completion of processing of a previous thread.

12. The system of claim 10, wherein a position of the stub is adjusted based on a comparison of a priority level of a current thread from the multi-thread legacy application and any other threads in the global run queue.

13. The system of claim 10, wherein the stub is placed in the per-processor queue when the multi-thread legacy application designates the fixed core affinity for a particular core of the processor.

14. The system of claim 10, wherein the processor is configured to pick the thread based on a sequence number assigned by a scheduler if two threads in the global run queue and the per-processor queue have equal priorities.

15. The system of claim 10, wherein a distinct per-processor queue is reserved for each processing core.

16. The system of claim 10, wherein a priority of the thread for determining its place in the global run queue or the per-processor queue is based on at least one from a set of: the priority designated by one of the single-thread legacy application, the multi-thread legacy application or the multi-core compatible application from which the thread was received, a time of arrival, a core availability, a number of pending threads, and a memory condition.

17. A computer-readable storage medium with instructions encoded thereon for managing application compatibility in a multi-core processor system, the instructions comprising:
receiving a thread from an application for processing by the multi-core processor system;
determining whether the thread has a fixed core affinity for being executed by a particular core of the multi-core processor system;
determining whether the received thread is from a single-thread legacy application, a multi-thread legacy application or a multi-core compatible application;
when the thread is determined to be from the single-thread legacy application, assigning the fixed core affinity to the thread when the received thread is determined not to have an included fixed core affinity and placing the thread in the order of its arrival to a per-processor queue associated with the included fixed core affinity or the assigned fixed core affinity;
when the thread is determined to be from the multi-thread legacy application, placing the received thread in a global run queue according to a determined priority when the thread is determined to not have the fixed core affinity to a particular core or placing the received thread in the per-processor queue when the thread is determined to have the fixed core affinity to a particular core; and
when the thread is determined to be from the multi-core compatible application, placing the thread in one of the global run queue and the per-processor queue based on a designation by the application and the determination of whether the thread has the fixed core affinity for being executed by a particular core of the multi-core processor system.

18. The computer-readable storage medium of claim 17, wherein the instructions further comprise:
   assigning a sequence number to the thread based on a time of arrival of the thread; and
   picking the thread with the smaller sequence number for processing if two threads with equal priority are available in the global run queue and the per-processor queue for the particular core.

19. The computer-readable storage medium of claim 17, wherein a highest priority thread from the multi-thread legacy application is placed in place of a stub upon completion of processing of a current thread from the same application.

20. The computer-readable storage medium of claim 19, wherein a position of the stub within the global run queue or the per-processor queue is adjusted based on a priority of the current thread in place of the stub and priorities of other threads in the global run queue or the per-processor queue.

* * * * *